July 30, 1957  A. E. W. JOHNSON  2,800,764
LIQUID DISPENSING APPARATUS PRESSURIZED FROM
ENGINE EXHAUST OF ENGINE DRIVEN VEHICLE
Filed Jan. 26, 1953
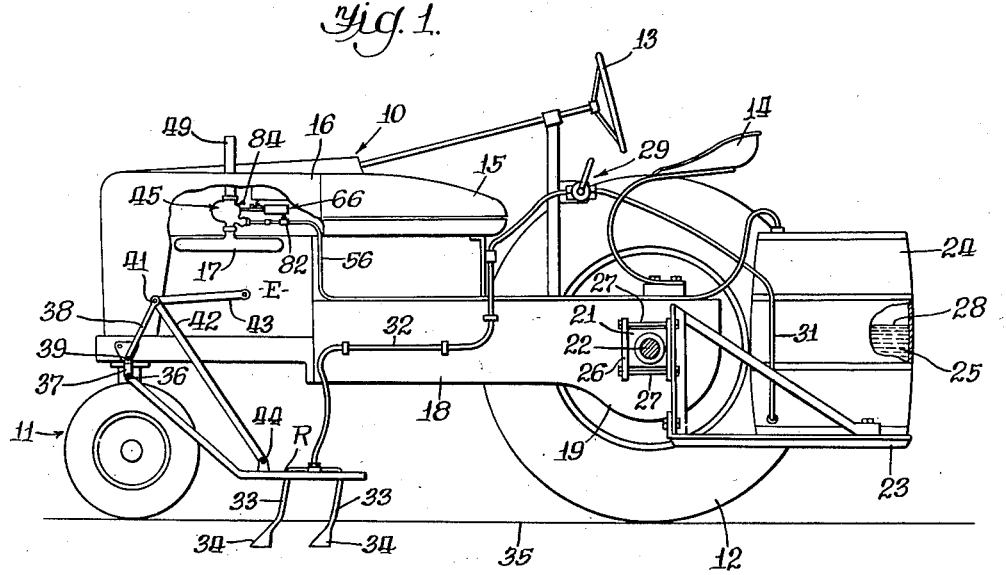
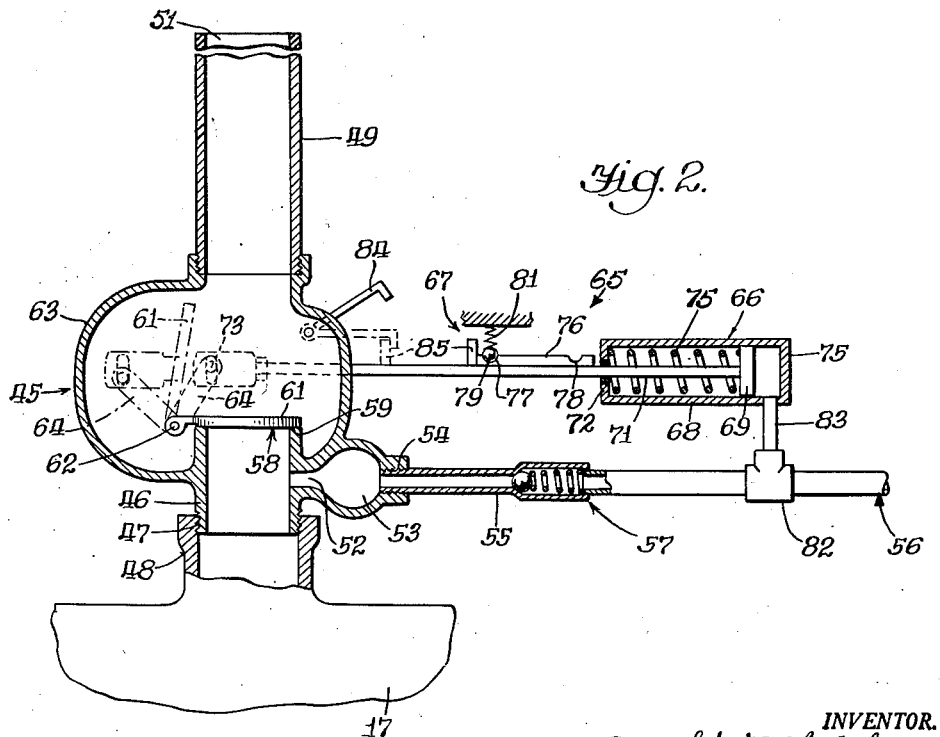
INVENTOR.
Arnold E. W. Johnson
BY Paul O. Pippel
Atty.

United States Patent Office 2,800,764
Patented July 30, 1957

2,800,764

LIQUID DISPENSING APPARATUS PRESSURIZED FROM ENGINE EXHAUST OF ENGINE DRIVEN VEHICLE

Arnold E. W. Johnson, Oak Park, Ill., assignor to International Harvester Company, a corporation of New Jersey Application January 26, 1953, Serial No. 333,138

3 Claims. (Cl. 60—29)

This invention has to do with pressurized liquid dispensing apparatus employed upon engine driven vehicles and relates more particularly to such an apparatus having means for periodically utilizing pressure from exhaust gas of the engine for creating liquid ejecting pressure in a supply tank for the liquid to be dispensed.

The present invention has particular utility in connection with tractor-mounted equipment for delivering metered quantities of a liquid type fertilizer into shallow ground furrows made by earth-penetrating applicators while the tractor moves across a field. Equipment commonly used for this purpose dispenses liquid anhydrous ammonia from a supply tank mounted upon a tractor. Inasmuch as liquid anhydrous ammonia tends to change from the liquid phase to the gaseous phase at atmospheric temperatures and pressures, this type of fertilizer medium provides its own dispensing pressure when contained within an hermetically sealed tank. The process of conversion from liquid anhydrous ammonia to the gaseous phase will occur at pressures up to substantially 100 lbs. per square inch at a temperature of 100° F. and since much higher temperatures may be incurred during the summer season at times when the storage tank is subjected to sun rays, the tank is made sufficiently strong to withstand a pressure of 200 lbs. per square inch to provide a safety factor preventing explosion of the tank during high temperature atmospheric operations.

Because of the high pressure which tanks holding anhydrous ammonia must be capable of withstanding, they are correspondingly heavy and costly. There is also an ever-present danger factor in view of the large quantity of the anhydrous ammonia which might escape with a small leak in view of the high pressures involved. Serious frost bite would be inflicted upon any part of the human body accidentally subjected to a small jet of the anhydrous ammonia.

The present invention contemplates use of a liquid fertilizing substance less noxious to humans and which may be preserved in its liquid phase at atmospheric temperatures and pressure and dispensed at a pressure only nominally in excess of atmospheric pressure. Examples of such liquid fertilizing agents are aqueous solutions of sodium nitrate, urea, and anhydrous ammonia gas (ammonium hydroxide). While many of these aqueous solutions which are suitable as fertilizers could be carried in a tank upon a tractor and dispensed into the soil through sub-surface applicators while being fed by gravitational head upon the liquid, the rate of discharge would change with variation in height of the liquid column.

One of the objects of this invention is the provision of simple and inexpensive mechanism capable of employing pressure derived from the exhaust of the tractor engine for imposing a nominal pressure of 15 to 25 lbs. per square inch (gauge) upon the fertilizing the liquid within the storage tank therefor to raise the entire range of operating pressures to which the dispensed liquid is subjected, and in this manner diminish the pressure variation factor attributable to diminution of gravitational head upon the liquid attendant to the comsumption of the liquid.

Another object of this invention is the provision of a novel type of pressure creating apparatus making it practicable to mount apparatus on a tractor enabling it to transport and dispense liquid forms of fertilizer not requiring strong tanks capable of withstanding high pressures incurred by a property of the liquid causing it to convert from a liquid to a gaseous phase at atmospheric pressure and temperatures.

The above and other desirable objects inherent in and encompassed by the invention are elucidated in the ensuing description, the appended claims and the annexed drawings, wherein:

Fig. 1 is a side elevational view of a farm tractor having a tank mounted thereon for a supply of liquid fertilizer, soil-penetrating applicators through which liquid from the tank is introduced below the soil surface, and also showing an elevation of a preferred embodiment of the present invention associated with the tractor engine exhaust manifold and exposed by virtue of a portion of the engine hood being broken away;

Fig. 2 is an enlarged view of the invention embodiment disclosed in Fig. 1, the principal parts being shown in vertical section to clarify the structure.

Although the invention is illustrated herein in association with a tank and dispensing apparatus for a liquid type fertilizer, it is contemplated that other uses are appropriate for the apparatus such as pressurized dispensation of sprays for insect control.

Referring now to the drawings, in Fig. 1 there is shown a farm tractor 10 of the tricycle type having a front steering truck 11 and rear traction wheels 12 of which only that on the distant side of the tractor is shown. The tractor has a steering wheel 13 accessible from an operator's seat 14. A fuel tank 15 extends rearwardly from a hood 16 which covers the tractor engine E having an exhaust manifold 17. A longitudinal body 18 of the tractor extends between the rear end of the engine E and a differential casing 19 from which axle housings 21 extend oppositely for respectively containing traction wheel driving axles 22.

A carrying frame 23 for a tank 24 containing a liquid type fertilizer 25 extends rearwardly from the differential housing 19 where it is mounted upon the axle housings 21 by means of plates 26 and tie bolts 27. The upper surface of the liquid fertilizer 25 is visible at 28. Gas at a pressure nominally in excess of atmospheric pressure is caused to fill that portion of the tank 24 above the liquid surface 28 whereby when an operator-controlled valve 29 is open the proper amount, the liquid is forced at a selected rate from the tank through a conduit 31, thence through the valve 29, into conduit 32 and branch conduits 33, into applicators 34 from which the liquid is discharged beneath the surface of the ground 35 into furrows formed by these applicators as the vehicle proceeds across the field. Applicators 34 are carried upon a tool rig R pivotally connected at 36 to a spar 37 projecting laterally from the tractor. A strut 38 is pivotally connected at 39 to the spar 37 and is pivotally connected at 41 at its upper end with an upper end of a link 42 and with the front end of a push rod 43. The lower end of the link 42 is pivotally connected at 44 with the rig R. A forward thrust by implement-controlling mechanism, not shown, upon the push rod 43 is operable through the strut 38 and the link 42 for lifting the applicator tools 34 from the ground into a transport position or for determining the depth of penetration of the applicators 34 below the ground surface.

Attention is now invited to Fig. 2 where valve means and a pressure sensitive control therefor is shown for utilizing pressure of the engine exhaust gas for attaining and maintaining a desired pressure in the tank 24 above the liquid level 28. An exhaust conduit 45 has a small diameter tubular lower portion 46 screw threaded at 47 into an outlet neck 48 of the engine exhaust manifold 17. A tubular upper portion 49 of the conduit 45 has a port 51 through which exhaust gas is dischargeable into the atmosphere. Inwardly from the port 51 is a gas transfer port 52 communicating into a small chamber 53 having an outlet 54 with which one section 55 of a gas transfer conduit 56 is communicatively connected. This conduit 56, having a check valve 57 therein, extends into communication with the upper part of the tank 24 as illustrated in Fig. 1.

Valve means 58 includes an annular valve seat 59 above the port 52 and closable by a cap-like valve member 61 constrained for rotation with an operating shaft 62 therefor (one end of the shaft 62 being visible in Fig. 2). Shaft 62 is journaled in a diametrically enlarged chamber portion 63 of the conduit 45. A section of the shaft 62 exteriorly of the conduit chamber 63 has a short arm 64 constrained for rotation therewith. When this arm 64 is in the dotted line position, the valve cap 61 will rest upon the annular seat 59 for closing the valve means 58 as illustrated in Fig. 2. Movement of the valve-controlling arm 64 from the dotted position to the dot-dash line position, also shown in Fig. 2, is accompanied by movement of the valve cap 61 to the dot-dash line position, thereby leaving the exhaust conduit 45 non-obstructing to the discharge of gas from the manifold 17 to and through the atmospheric discharge port 51.

The pivotal position of the valve cap 61 is determined automatically by a pneumatic ram device 65. This ram device includes a pneumatic ram 66 and a detent device 67. The pneumatic ram includes a cylinder 68 reciprocally containing a piston 69 having a piston rod 71 extending therefrom through the rod end 72 of the cylinder into pivotal connection at 73 with the valve-operating arm 64. A spring 74 in the cylinder 68 urges the piston 69 toward the head end 75 of the cylinder. The piston rod 71 has a detent member 76 fixedly mounted thereon and contains detent ball receiving notches 77 and 78 spaced apart lengthwise of the rod. When the piston 69 is disposed adjacently to the head end 75 of the cylinder, as illustrated in Fig. 2, the notch 77 receives a detent ball 79 pressed thereinto by a spring 81 of the detent device 67. Movement of the piston 69 leftward by an increase of gas pressure in the head end of the cylinder 68 will pivot the valve-operating arm 64 and the valve cap 61 into their dot-dash line positions for opening the valve device 58 incident to the notch 78 being carried into registry with the spring-pressed ball 79 which cooperates with the notch 78 in yieldably resisting return of the piston 69 under the force of the compressed spring 74.

The gas transfer conduit 56 includes a T-coupling 82 from which a portion of the conduit 56 leads to communication with the tank 24 at its upper end. A conduit lateral 83 communicates with the conduit 56 through the coupling 82 and also communicates with the head end of the pneumatic ram cylinder 68.

Operation of the apparatus

The apparatus is maintainable in an inoperable condition by lowering a hook 84 into hooking relation with an element 85 fixed to the piston rod 71 when this element is moved leftward with the piston 69 and piston rod for opening the valve device 58. Such lowering of the hook 84 will cause it to cooperate with the element 65, as illustrated by the dotted line positions of such hook and element in Fig. 2, to thereby maintain the valve device 58 open irrespective of gas pressure within the gas transfer conduit and in the pneumatic ram cylinder 68.

Assuming the apparatus to have been placed in operation by lifting of the hook 84, and further assuming the tank 24 to have been partially filled with the fluid 25 but without there being gas pressure above the liquid level 28 in excess of atmospheric pressure, the ram spring 74 will be effective for returning and maintaining the piston 69 in the position illustrated in Fig. 2. This closes the valve device 58. Also assuming that the tractor engine E is operating, such closing of the valve device 58 will cause exhaust gas to be directed from the exhaust manifold 17 through the gas transfer port 52 into the chamber 53, thence through conduit section 55, past the check valve 57 and thence through the conduit 56 into the upper part of the tank 24. Gas pressure within the upper part of the tank and within the conduit 56 is communicated through the conduit lateral 83 into the head end 75 of the pneumatic ram. The force of the ram spring 74 is supplemented by the detent device 67 for resisting leftward movement of the ram piston under the force developed by gas pressure in the head end of the ram. Therefore, incident to the exhaust gas pressure building up in the tank 24 to a preselected maximum pressure, such as 20 lbs. per square inch, this same pressure within the head end of the ram will overcome the force of the detent device and the spring 74 whereupon the detent ball 79 rides upward out of the notch 77 making the detent device no longer effective for resisting movement of the piston whereby the piston quickly compresses the spring 74 incident to moving the detent notch 78 into registry with the ball 79 and incident to opening the exhaust valve device 58. Upon the opening of the exhaust valve device there is insufficient back pressure of the exhaust gas in the conduit 45 to divert any portion of the gas through the gas transfer exhaust port 52 past the check valve 57. This check valve, however, maintains the predetermined maximum pressure within the line 56 and the tank 24.

As the liquid 25 is dispensed into the soil through the applicators 34 at a rate determined by the valve 29, the gas pressure within the tank will correspondingly diminish. The forces developed by the pneumatic ram spring 74 and the detent spring 81 are so selected that upon the gas pressure within the tank 24 diminishing to a predetermined minimum, the force developed by this gas pressure upon the right end of the ram piston 69 and the resistance of the detent device 67 to movement of the piston rod will be overcome by the spring 74, whereupon the piston 69 will suddenly move to the position illustrated in Fig. 2 to repeat that part of the cycle of restoring the gas pressure in the tank to the selected maximum pressure attendant to closure of the valve device 58. As long as the latch member 84 remains in the unlatched position with respect to the element 85, the apparatus will continue to cycle for periodically using exhaust gas of the engine for restoring pressure within the tank 24 to a maximum pressure such as 20 lbs. per square inch immediately upon the lowering of such pressure to a minimum such as 15 lbs. per square inch. A reasonably constant pressure is thus assured with attendant reasonably uniform flow rate through the metering valve 29 so that substantially a uniform quantity of the liquid fertilizer is dispensed through the applicators 34 irrespective of the amount of liquid and the pressure head afforded thereby in the tank 24.

Having described a single preferred embodiment of the invention with the view of clearly and concisely illustrating the same, I claim:

1. In liquid dispensing apparatus mounted upon a vehicle driven by an internal combustion engine from which gas is exhausted, an exhaust conduit for the exhaust of said gas and having an atmospheric exhaust port and a gas transfer port spaced inwardly from said atmospheric exhaust port, a tank from which liquid is to be dispensed by the force of gas pressure within a section of the tank, a gas transfer conduit communicating between said gas transfer port and said tank section, valve means interposed between the exhaust conduit ports and operably when closed to direct the exhaust gases through the pressure transfer conduit into said section of the tank, a check valve in the pressure transfer conduit to prevent reverse flow of gas through such conduit from the tank into the exhaust conduit, said valve means being operable when open to facilitate normal discharge of exhaust gas through the exhaust conduit atmospheric port, and valve operating means comprising a pneumatic ram operably connected with said valve means and being alternately operable in opposite directions for respective expansion and contraction thereof, said ram being operable to open said valve means attendant to operation in one of said directions and to close said valve means attendant to operation in the other of said directions, means providing communication between the ram and the tank to subject the ram to the pressure in said tank, said ram being operable in the one direction for opening the valve means when subjected to such pressure in excess of a maximum pressure, and biasing means operable of the ram in the other direction for closing said valve means attendant to diminution of such pressure below a minimum.

2. The combination set forth in claim 1, wherein there is detent means yieldably resisting expansion of the ram while it is contracted and likewise resisting contraction of the ram while it is expanded.

3. The combination set forth in claim 2, wherein there is means manually settable for retaining the valve means open irrespective of the magnitude of gas pressures imposed upon the ram.

References Cited in the file of this patent

UNITED STATES PATENTS

| | | |
|---|---|---|
| 841,859 | Gay | Jan. 22, 1907 |
| 1,111,556 | Bakels | Sept. 22, 1914 |
| 1,981,400 | Tobin | Nov. 20, 1934 |
| 2,116,434 | Hollister | May 3, 1938 |
| 2,350,102 | Fairbanks | May 30, 1944 |